(No Model.)
S. J. ADAMS.
SAND MOLD.
No. 521,451. Patented June 19, 1894.
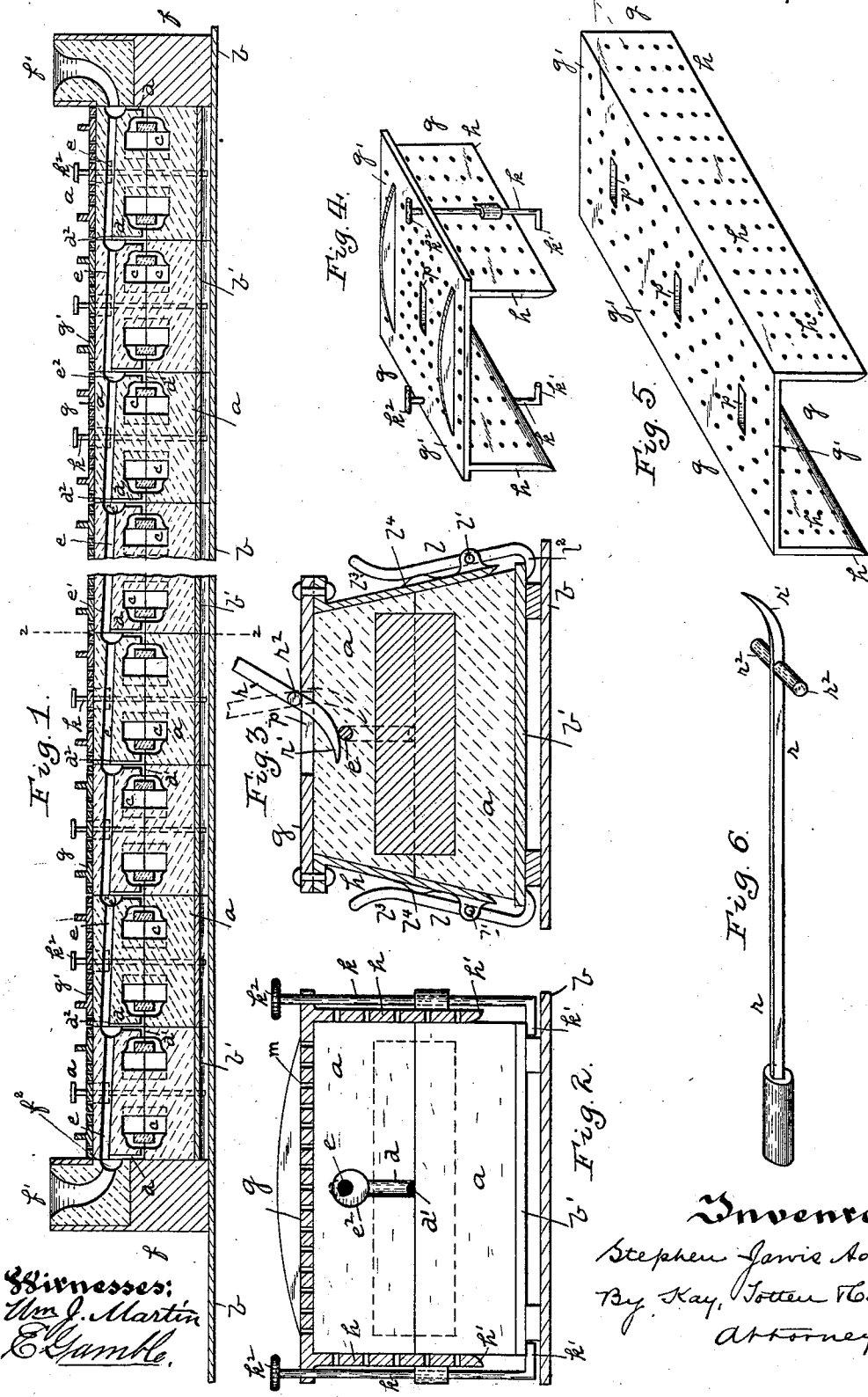
Witnesses:
Wm J. Martin
E. Gamble
Inventor,
Stephen Jarvis Adams.
By Kay, Totten & Cooke,
Attorneys.

UNITED STATES PATENT OFFICE.

STEPHEN JARVIS ADAMS, OF PITTSBURG, PENNSYLVANIA.

SAND MOLD.

SPECIFICATION forming part of Letters Patent No. 521,451, dated June 19, 1894.

Application filed October 24, 1892. Serial No. 449,906. (No model.)

*To all whom it may concern:*

Be it known that I, STEPHEN JARVIS ADAMS, a resident of Pittsburg, in the county of Allegheny and State of Pennsylvania, have invented a new and useful Improvement in Sand Molds; and I do hereby declare the following to be a full, clear, and exact description thereof.

My invention relates to sand molds, and has special reference to the supporting of a series of molds in line and in contact with each other and to which the metal is fed from a common point, so that the mold may be employed without special flasks for each mold and be so supported as to confine the metal during casting. It also includes some improvements in the continuous runner for feeding the metal from the common point of supply to the several molds in the series. The invention relates to the same class of molds as described in an application of even date herewith, Serial No. 449,905, in which the broad idea of the inclosed continuous runner extending through and feeding a series of molds is more particularly described.

The present invention consists, in the first place, in a series of sand molds arranged in line with each other and having the continuous runner through such series of molds formed on an incline in each mold, so that as the metal is fed thereto it will be directed into the channel leading from the continuous runner to the mold cavity of each mold, and liability of the metal flowing over into the portion of the continuous runner in the next mold before that mold cavity is filled will be overcome.

It also consists in an abutment or end portion to confine the end of the series of molds having a reservoir or basin to receive the metal of the ladle formed therein and communicating with the continuous runner in the series of molds.

It also consists in a mold cover fitting over the top and side portions of the mold, and to certain improvements in such form of mold cover for connecting it to the mold support for permitting the escape of gases, as well as to other improvements as will be hereinafter more particularly set forth and claimed.

To enable others skilled in the art to make and use my invention, I will describe the same more fully, referring to the accompanying drawings, in which—

Figure 1 is a longitudinal section of a series of molds illustrating the invention. Fig. 2 is an enlarged cross section on the line 2—2, Fig. 1, showing the cover extending over the molds and connected to the mold support, such, for example, as to the bottom board. Fig. 3 is an enlarged cross section of the mold illustrating another form of the mold cover and the cutting of the continuous runner. Fig. 4 is a perspective view of one of the mold covers. Fig. 5 is perspective view of the mold cover in the form to cover or inclose more than one of the molds in a series; and Fig. 6 illustrates a form of knife for cutting or severing the metal cast within the continuous runner so as to separate the castings from each other.

Like letters of reference indicate like parts in each of the views.

The molds with which my invention is employed may be formed in any suitable way, apparatus for forming the continuous runner through the individual molds and the channels or runners leading therefrom to the mold cavities being described in an application filed by me May 8, 1893, Serial No. 473,357, being a divisional application based on said application Serial No. 449,905, so that it will not be necessary to describe it here.

The several molds $a$ forming the series are built upon a suitable bed plate or supporting plate, such as at $b$, and each mold preferably rests upon a bottom board, as at $b'$, which bottom board is made of no greater length than the length of the mold in the direction of the series of molds, so that each mold body may be placed against and in close contact with the mold body next to it and form a close joint therewith. In the molds illustrated the mold cavities are shown at $c$ and they are fed by means of the downwardly extending channels or runners $d$, and the cross gate or runner $d'$; and extending through the bodies of the sand molds above the mold cavities is the continuous runner $e$ which communicates with the downwardly extending runners $d$, the sand molds being placed in close contact as above stated so that the portions $e'$ of the said runner $e$ in the several molds form a continuous and inclosed runner through the series of molds. The down-take channel $d$ is preferably formed on one face or side of each mold as described in said application, Serial No. 449,905. The portion $e'$ of the continuous runner $e$ in each mold is formed on an incline through the mold, so that as the metal enters this continuous runner, as it flows in a down course through each portion $e'$, it will strike against a shoulder or abutment, as at $d^2$, which will direct the metal into the runner $d$, so that it will naturally fill the mold cavity fed by said runner $d$ before passing into the next section of the continuous runner. To insure this, I also prefer to make an enlargement or pocket $e^2$ in the continuous runner at the point of its junction with the down-take runner, so forming a larger space to receive the metal and a small head or reservoir from which the metal is fed into the mold cavity. Where the metal is flowing in the opposite direction, that is, upwardly through the inclined sections $e'$ of the runner, it will flow over the abutment $d^2$ and enter the pocket $e^2$ and naturally feed into the mold cavity before passing into the next inclined section of the runner.

To inclose the molds at the end of the series, and to form a reservoir or head to feed the metal to or receive it from the continuous runner at one or both ends of the series of molds, I provide the abutment $f$ which fits against the face of the end mold in the series and extends above the same, and in which is formed the reservoir or basin $f'$ into which the metal may be poured, this reservoir having an opening in the side thereof which communicates directly with the end of the continuous runner, as at $f^2$. Such abutment may be employed at each end of the series of molds, the metal being poured into either one, and the other acting to receive any surplus metal after all the molds are filled and also to hold the surplus metal to provide a head or body of fluid metal to fill the mold cavities during the metal shrinking process, and by the pressure of such body of metal to force out any gases and steam in the mold cavities through the sand of the mold, thus insuring perfect castings. The abutments may be formed of metal or fire clay, or may have the form of a flask having the reservoir portion formed of sand suitably packed therein, the point of the abutment being that it shall serve as a pouring gate and reservoir and an abutment to confine the ends of the series of molds.

The cover $g$, by which the top and sides of the metal are confined, is formed of the top plate $g'$ and the side plates $h$, these parts conforming to the shape of the outside of the mold, the side plates either being vertical or inclined, according to the shape of the mold, and both being shown in the drawings. The side plates in the covers shown are made rigid with the top plate, so that the mold cover when placed over the mold will confine its top and side portions, being held in place either by its own weight or by weights placed thereon, or, as preferred by me, by catches or clamps engaging with some part of the mold support, either with the metal plate $b$ on which the series of molds is built, or with the bottom board $b'$ which supports the mold. The lower edges $h'$ of the side plates are made downwardly flaring, so that as the covers are placed over the molds they will be guided into position to slip down easily, and slick the sides of the molds to bring the side plates to a proper bearing thereon. In the construction shown in Fig. 2, the catches $k$ are journaled in the body of the mold cover so that they may be turned therein, and they have the handles $k^2$ extending above the mold cover by which the operator can turn the catches and cause the lips $k'$ to catch under the bottom board, and so connect the cover to, or disconnect the cover from the bottom board. This forms a simple and easily handled cover, the handles $k^2$ forming the means for lifting the cover in placing it on or removing it from the mold.

In Fig. 3 the catches are hinged instead of journaled to the side plates of the cover and extend up within reach of the user's hand in position to operate as he handles the cover, the catches $l$ being hinged at $l'$ having the clips $l^2$ and the upper ends or handles $l^3$ being forced outwardly by the springs $l^4$. In such case, as the operator lifts the cover, he presses upon the handles of the catches so as to release the same from the bottom board or supporting plate, and he then lifts off the cover which may be transferred to another mold or series of molds. As the metal poured is practically caused to enter the mold cavities under pressure and the gases are prevented from escaping through the pouring gate, it is evident that there must be free escape of the gases through the sand, and that the mold must not be so confined as to prevent such escape, and for this purpose the mold covers are perforated as shown, so as to give the necessary support to the top and sides of the mold to confine it as the metal enters the mold cavity and yet permit the practically free escape of the gases. Such perforations are shown at $m$. These mold covers may be employed of the size corresponding to each individual mold, or of such size as to cover a series of molds, either form being found to work well and both being illustrated in the drawings. It is evident that when the metal is poured within the mold cavity as it passes through the continuous runners the continuous runners are filled with the metal when the casting is completed, and so all of the castings formed within the series of molds are connected to each other; and in order to separate the castings I provide in the mold cover the transverse slot or opening $p$ which extends over the continuous runner and through which any suitable instrument may be inserted to cut or sever the metal within the continuous runner when it is partially set, but still soft so that it may be easily cut. For the purpose of cutting the metal within the runner, I prefer to employ such an instrument as shown in Fig. 6, the runner cutter $r$ having the knife portion $r'$ and the fulcrum bar $r^2$, and the operator inserting the knife through the mold cover and forcing it down through the sand until it passes underneath the runner, when by pressing on the handle with the fulcrum bar $p^2$ resting on the mold cover, the metal in the runner can be easily cut through so severing the castings from each other and providing for the easy handling of the same in withdrawing them from the molds.

In employing the invention in forming a series of castings, the molds as they are formed are placed upon the bed plate $b$, the faces of the molds contacting with each other and the channel $d$ in the face of the one mold registering with the runner or channel $d$ formed in the face of the other mold, while the section of the continuous pouring gate of one mold is brought in communication with the section of the continuous runner in the next series of molds; and at the end of the series the abutment $f$ is placed so that the opening $f^2$ in the base of the basin communicates with the runner at one end of the series, a like abutment being employed at the other end, if necessary. The operator then places over each mold the mold cover $g$, and where the form shown in Fig. 2 is employed is lifted by means of the handles $k^2$ of the catches $k$, and after lowering it to position he turns the handles so as to cause the clips $k'$ to engage the bottom boards or the bed plate, placing one such mold cover over each mold, or placing a long mold cover over a number of molds, as may be found desirable. The molds are then ready for casting and the metal is poured through the basin in the abutment, the metal entering the continuous runner $e$ and flowing down through the same until it enters the pocket $e^2$ and the down-take channel or runner $d$ and flows into the mold cavity or cavities, the metal striking against the shoulder or abutment $d^2$ formed by the face of the mold so that it naturally passes into the down-take channel and the metal which is first passed through the inclined portion of the continuous runner extending over that mold being carried into the mold cavity so that it is not required to heat up more than one of the inclined sections of the continuous runner. Of course while that mold cavity is being filled the metal may flow over into the next inclined section of the continuous runner, but in such case it will be fresh metal which has not been chilled in passing through the first inclined section of the continuous runner, and consequently one portion of the metal is not required to heat up more than one such section, and as a result the metal will flow for any distance required, it being found that as the metal is inclosed and protected from the atmosphere it will flow for as long a distance as necessary to fill the entire series of molds, and that it is practically as fluid and at as high a heat at the end of a long series of molds as at the pouring basin. At the same time the pockets $e^2$ and abutments $d^2$ direct the metal into the down-take runners and the pockets hold any surplus metal, so preventing it overflowing into the next inclined section of the runner. If the metal is poured from the other end of the series of molds, its movement will be practically the same, except that it flows upwardly through the inclined sections of the continuous runner and drops thence directly into the down-take channel, and if the supply is greater than will be taken up by the channel $d$, the metal may rise in the next inclined section but it will simply act as a head to force the metal into the channel $d$ and the flow of any metal through the continuous runner in such way that it is required to heat up two of such sections is prevented. When the metal reaches the end of the series of molds, it will rise within the reservoir at that end, and the metal within the reservoir at each end of the series acts as a head or body to insure the perfect filling of the mold cavities and to force any gases through the sand walls of the mold cavities, practical use showing that the castings formed are much more perfect than in the ordinary castings filled through such individual pouring gates. After the metal has chilled somewhat, the castings in the series may be separated as found desirable by cutting through the metal in the continuous runner at any desired point, such, for example, as by means of the cutter $r$ entering through the slots $p$ in the mold cover as above described, or between separate covers, such method of first casting the series of molds and then separating the castings while still confined within the mold being, as I believe, entirely novel. As soon as the metal is sufficiently set, the mold covers can be quickly lifted from the series of molds on which they have been employed and applied to another series, the operator simply catching the handles $k^2$ of the mold covers such as shown in Fig. 2, turning the handles so as to free the lips of the catches from the bottom boards, and lifting up the mold covers by said handles and applying them to the molds in the series next to be cast. With the mold cover shown in Fig. 3, as he lifts the covers he simply presses upon the handles of the spring catches $l$, freeing them from the bottom boards, and so removing the mold covers and applying them to the next series.

Extended use of the invention has proven that practically perfect castings may be formed, and, even in the making of large castings, a fine grade of molding sand may be used, as the metal in the long continuous runner and in the reservoir acts in such way as to prevent the escape of gas through any of the runners and as a head to force it through the porous bodies of the molds; and, as a matter of fact, I have been able to form large castings in molds with comparatively thin walls and with much smoother surfaces than has heretofore been obtained. At the same time the employment of individual flasks to contain such large molds during the casting of the metal is overcome, one of the large expenses in the making of large castings being thus done away with. I am also able to reduce the labor of the workmen, doing away with the slow work of pouring each individual mold, which has heretofore been found to be the most laborious work of the metal founder, and at the same time to require the greatest skill, the pouring of a long series of molds requiring only two workmen, the one to regulate the flow of the metal from the ladle to the reservoir, and the other to watch the other reservoir to discover when the metal reaches the end of the series at that end thereof.

What I claim as my invention, and desire to secure by Letters Patent, is—

1. In sand molds, the combination of a series of sand molds in contact with each other, an inclosed continuous runner extending through the same, and runners leading from the continuous runner to the individual mold cavities the section of the continuous runner in each mold being formed on an incline, substantially as and for the purposes set forth.

2. In sand molds, the combination of a series of sand molds in contact with each other, and an inclosed continuous runner extending through the same, the section of the runner extending through each mold being formed on an incline, and a down-take runner or channel leading from such continuous runner at the point of junction of two of such molds and communicating with the mold cavities, substantially as and for the purposes set forth.

3. In sand molds, the combination of a series of molds placed in contact with each other, an inclosed continuous runner extending through such series, each section of such runner in each mold being formed on an incline, and having a pocket at the lower end thereof, and runners leading from such continuous runner to the individual mold cavities, substantially as and for the purposes set forth.

4. In sand molds, the combination of a series of sand molds placed in contact with each other, an inclosed continuous runner extending through such series, the section of such runner in each mold being formed on an incline and having a pocket $e^2$ at the lower end thereof, and the molds having the abutments or shoulders $d^2$ opposite such pockets $e^2$ and runners leading from such continuous runner to the individual mold cavities, substantially as and for the purposes set forth.

5. In sand molds, the combination of a series of sand molds placed in contact with each other, an inclosed continuous runner extending through such series, the section of such runner in each mold being formed on an incline, and the molds having abutments or shoulders $d^2$ at the lower ends of such inclined sections of the continuous runner, and runners leading from the lower ends of such inclined sections to the mold cavities, substantially as and for the purposes set forth.

6. In sand molds, the combination of a series of sand molds placed in contact with each other, and having a continuous runner extending through the series of molds and runners leading therefrom to the mold cavities, and an abutment confining the end mold of said series and having a reservoir or basin formed therein and communicating with the continuous runner extending through the series of molds, substantially as and for the purposes set forth.

7. In sand molds, the combination of a series of sand molds placed in contact with each other and having a continuous runner extending through such series and runners leading therefrom to the mold cavities, and an abutment having the basin $f'$ and the side opening $f^2$ communicating with the continuous runner in the series of molds, substantially as and for the purposes set forth.

8. In sand molds, the combination of a series of molds placed in contact with each other, and having a continuous runner extending through such series, and runners leading therefrom to the mold cavities, and an abutment having the basin $f'$ and the side opening $f^2$ communicating with the continuous runner in the series of molds, such basin within the abutment being formed of sand, substantially as and for the purposes set forth.

9. In sand molds, the combination of a sand mold resting on a suitable support and a mold cover adapted to fit over the top and down two opposite sides thereof and so confine the mold, and catches to engage with the mold support and so hold the mold cover around the mold, substantially as and for the purposes set forth.

10. In sand molds, the combination of a sand mold resting on a suitable support and a mold cover having a top portion and side portions rigid therewith and extending down therefrom to confine the sides of the mold, the lower portions of the side plates being outwardly flaring, substantially as and for the purposes set forth.

11. The combination with a sand mold, of a cover or mold confiner, and catches journaled and rotatable in the mold cover and provided with lips to engage with the mold support, substantially as and for the purposes set forth.

12. The combination with a sand mold of the cover $g$ having the top portion $g'$ and side plates $h$, the catches $k$ journaled in the mold cover and having handles $k^2$ and the lips $k'$ at the lower end, and a mold support with which such catches engage, substantially as and for the purposes set forth.

13. In sand molds, the combination with a set or series of molds placed in contact with each other, and having an inclosed continuous runner extending through the same, and runners leading from the continuous runner to the individual mold cavities, of a cover extending over one or more of the molds and having an opening therein, and a knife or cutter adapted to pass through such opening and sever the metal in the continuous pouring runner within the series of molds, substantially as and for the purposes set forth.

14. The herein-described method of forming castings, consisting in casting metal within a set or series of sand molds placed in line with each other by feeding the metal through a continuous runner communicating with the mold cavities in said series of molds, and subsequently, while the metal is confined within the said molds, severing the metal within the continuous runner to separate the castings from each other, substantially as and for the purposes set forth.

15. The herein-described method of forming castings, consisting in casting metal within a set or series of sand molds placed in line with each other by feeding the metal through a continuous runner communicating with the mold cavities in said series of molds, and subsequently, while the metal is confined within the molds and before it is fully set, severing the metal within the continuous runner to separate the castings from each other, substantially as and for the purposes set forth.

In testimony whereof I, the said STEPHEN JARVIS ADAMS, have hereunto set my hand.

STEPHEN JARVIS ADAMS.

Witnesses:
   JAMES I. KAY,
   J. N. COOKE.